(12) United States Patent
Graham

(10) Patent No.: US 7,520,050 B2
(45) Date of Patent: Apr. 21, 2009

(54) APPARATUS AND METHOD FOR A MOLDED WAVEGUIDE FOR USE WITH TOUCH SCREEN DISPLAYS

(75) Inventor: David S. Graham, Mountain View, CA (US)

(73) Assignee: PoaSana Liquidating Trust, Mountain View, CA (US)

( * ) Notice: Subject to any disclaimer, the term of this patent is extended or adjusted under 35 U.S.C. 154(b) by 159 days.

(21) Appl. No.: 11/612,099

(22) Filed: Dec. 18, 2006

(65) Prior Publication Data

US 2007/0154133 A1 Jul. 5, 2007

Related U.S. Application Data

(62) Division of application No. 10/861,251, filed on Jun. 4, 2004.

(51) Int. Cl.
*H01R 43/00* (2006.01)
*G02B 6/00* (2006.01)

(52) U.S. Cl. .......................... 29/825; 385/129; 385/132

(58) Field of Classification Search ................... 29/825, 29/832; 385/129, 132
See application file for complete search history.

(56) References Cited

U.S. PATENT DOCUMENTS

| | | | |
|---|---|---|---|
| 3,832,028 A | 8/1974 | Kapron | |
| 4,262,996 A | 4/1981 | Yao | |
| 4,367,916 A | 1/1983 | Mottier et al. | |
| 4,440,468 A | 4/1984 | Auracher et al. | |
| 4,746,770 A | 5/1988 | McAvinney | |
| 4,916,308 A | 4/1990 | Meadows | |
| 5,061,029 A * | 10/1991 | Ishikawa | 385/132 |

(Continued)

FOREIGN PATENT DOCUMENTS

CN 1260060 A 7/2000

(Continued)

OTHER PUBLICATIONS

Office Action in U.S. Appl. No. 10/862,003, mailed Jun. 2, 2008.

(Continued)

*Primary Examiner*—C. J Arbes
(74) *Attorney, Agent, or Firm*—Beyer Law Group LLP

(57) ABSTRACT

An apparatus and method for an inexpensive, simple to make, self-aligning molded waveguide made of an optically transparent material and that can be used to generate a grid or lamina of light for use with touch screen displays. The molded waveguide substrate includes a plurality of lenses and a plurality of waveguide grooves corresponding to the plurality of integral lenses respectively. After the substrate is molded, the grooves are filled with an optically transparent material to optically couple and align the plurality of lenses and the plurality of grooves respectively. In one application, the molded waveguide substrate is positioned adjacent a touch screen device. A light transmitter and an imaging device are optically coupled to the molded waveguide substrate, and a processing device is coupled to the imaging device. The processing device is configured to determine a data entry to the touch screen by deciphering the coordinates of an interrupt in the light created in the free space adjacent the touch screen device when a data entry is being made to the touch screen device.

34 Claims, 6 Drawing Sheets

U.S. PATENT DOCUMENTS

| | | | |
|---|---|---|---|
| 5,136,682 | A | 8/1992 | Moyer et al. |
| 5,332,690 | A | 7/1994 | Cho et al. |
| 5,414,413 | A | 5/1995 | Tamaru et al. |
| 5,432,877 | A | 7/1995 | Sun et al. |
| 5,480,764 | A | 1/1996 | Gal et al. |
| 5,533,151 | A * | 7/1996 | Leonard ............ 385/3 |
| 5,540,612 | A | 7/1996 | Mendez et al. |
| 5,604,835 | A | 2/1997 | Nakamura et al. |
| 5,719,973 | A | 2/1998 | Monroe et al. |
| 5,850,498 | A | 12/1998 | Shacklette et al. |
| 5,914,709 | A | 6/1999 | Graham et al. |
| 6,181,842 | B1 | 1/2001 | Francis et al. |
| 6,341,189 | B1 | 1/2002 | Deacon |
| 6,351,260 | B1 | 2/2002 | Graham et al. |
| 6,403,393 | B1 * | 6/2002 | Adkisson et al. ............ 438/31 |
| 6,456,766 | B1 | 9/2002 | Shaw et al. |
| 6,470,130 | B1 | 10/2002 | Walker et al. |
| 6,491,443 | B1 | 12/2002 | Serizawa et al. |
| 6,538,644 | B1 | 3/2003 | Muraoka |
| 6,555,288 | B1 * | 4/2003 | Xu et al. ............ 430/270.1 |
| 7,099,553 | B1 | 8/2006 | Graham et al. |
| 7,164,156 | B2 * | 1/2007 | Geusic et al. ............ 257/84 |
| 2002/0030668 | A1 | 3/2002 | Hoshino et al. |
| 2002/0118907 | A1 | 8/2002 | Sugama et al. |
| 2003/0035632 | A1 | 2/2003 | Glebov et al. |
| 2003/0174943 | A1 | 9/2003 | Caracci et al. |
| 2003/0203315 | A1 | 10/2003 | Farahi et al. |
| 2003/0231851 | A1 | 12/2003 | Rantala et al. |
| 2004/0017974 | A1 | 1/2004 | Balch et al. |
| 2004/0022487 | A1 | 2/2004 | Nagasaka et al. |
| 2004/0076382 | A1 | 4/2004 | Saia et al. |
| 2004/0247236 | A1 | 12/2004 | Yoshimura et al. |
| 2005/0094914 | A1 | 5/2005 | Gines et al. |
| 2005/0128190 | A1 | 6/2005 | Ryynanen |
| 2005/0271983 | A1 | 12/2005 | Payne et al. |
| 2006/0001653 | A1 | 1/2006 | Smits |
| 2006/0002655 | A1 | 1/2006 | Smits |
| 2006/0088244 | A1 | 4/2006 | Kukulj et al. |
| 2006/0188196 | A1 | 8/2006 | Charters et al. |
| 2007/0025678 | A1 | 2/2007 | Kushibiki et al. |
| 2007/0237478 | A1 | 10/2007 | D'Aguanno et al. |

FOREIGN PATENT DOCUMENTS

| | | |
|---|---|---|
| EP | 0569181 | 11/1993 |
| EP | 1271211 | 1/2003 |
| JP | 63-303308 | 12/1988 |
| JP | 200078349 | 3/2000 |
| JP | 2003177264 | 6/2003 |
| JP | 2004125899 | 4/2004 |
| WO | WO02/095668 | 11/2002 |
| WO | WO03/025644 | 3/2003 |
| WO | WO03/071323 | 8/2003 |
| WO | WO2004/011974 | 2/2004 |

OTHER PUBLICATIONS

Office Action in U.S. Appl. No. 10/817,564, mailed May 28, 2008.
International Search Report in PCT/US2007/017134, mailed May 26, 2008.
Written Opinion in PCT/US2007/017134, mailed May 26, 2008.
Paloczi et al. "Free-standing All-polymer Microring Resonator Optical Filter", Electronics Letters, IEE Stevebage, GB, vol. 39, No. 23, Nov. 13, 2003, pp. 1650-1651.
Office Action in U.S. Appl. No. 11/734,631, mailed Jul. 11, 2008.
Notice of Allowance in U.S. Appl. No. 10/861,251 mailed Jun. 27, 2008.
Allowed Claims for U.S. Appl. No. 10/861,251.
Office Action in Chinese Application 200580024970.4, mailed Aug. 15, 2008.
Office Action from Chinese Application 200580024976.1, mailed Aug. 15, 2008.
U.S. Appl. No. 10/758,759, filed Jan. 15, 2004.
U.S. Appl. No. 10/862,003, filed Jun. 4, 2004.
U.S. Appl. No. 10/817,564, filed Apr. 1, 2004.
U.S. Appl. No. 10/861,251, filed Jun. 4, 2004.
International Search Report and Written Opinion for related PCT application PCT/US2005/019560, mailed on Mar. 22, 2006.
International Search Report for related PCT application PCT/US2005/019480, mailed on Nov. 22, 2005.
International Search Report and Written Opinion for PCT Application PCT/US04/10297, mailed on Sep. 13, 2004.
Office Action in U.S. Appl. No. 10,758,759, mailed Aug. 25, 2005.
International Search Report and Written Opinion for corresponding PCT application PCT/US2005?019556, mailed on Aug. 29, 2005.
Chen, R. T. "Polymer-Based Photonic Integrated Circuits", Optics and Laser Technology, Elsevier Science Publishers BV, Amsterdam, NL, vol. 25, No. 6, Dec. 1, 1993, pp. 347-365.
Office Action in U.S. Appl. No. 10/862,003, mailed Dec. 14, 2007.
Notice of Allowance in U.S. Appl. No. 11/542,816, mailed Dec. 11, 2007.
Allowed Claims from U.S. Appl. No. 11/542,816.
Office Action in U.S. Appl. No. 10/817,564, mailed Sep. 21, 2007.
Office Action in U.S. Appl. No. 10/861,251, mailed Jan. 16, 2008.
Office Action in U.S. Appl. No. 10/758,759 mailed Jan. 25, 2008.
Office Action from Corresponding Chinese Application 200580024970.4, mailed Nov. 30, 2007.
Office Action from Corresponding Chinese Application 200580024976.1, mailed Nov. 30, 2007.
Final Office Action in U.S. Appl. No. 11/734,631 mailed Mar. 17, 2008.
International Search Report from PCT/US07/80346 mailed on Mar. 4, 2008.
Written Opinion from PCT/US07/80346 mailed Mar. 4, 2008.
Office Action in Chinese patent application No. 2005800263928, mailed Mar. 7, 2008.
Notice of Allowance in U.S. Appl. No. 10/758,759 mailed Sep. 25, 2008.
Allowed Claims for U.S. Appl. No. 10/758,759.
Office Action in Chinese Patent Application No. 200580026392.8 dated Aug. 29, 2008.
Notice of Allowance in U.S. Appl. No. 11/734,631 mailed Oct. 9, 2008.
Allowed Claims for U.S. Appl. No. 11/734,631.
Office Action in U.S. Appl. No. 10/817,564 mailed Oct. 16, 2008.
Office Action in U.S. Appl. No. 11/498,356 mailed Oct. 16, 2008.

* cited by examiner

APPARATUS AND METHOD FOR A MOLDED WAVEGUIDE FOR USE WITH TOUCH SCREEN DISPLAYS

PRIORITY CLAIM

This application is a divisional application of and claims priority U.S. patent application Ser. No. 10/861,251, filed Jun. 4, 2004, which is incorporated herein in its entirety and for all purposes.

BACKGROUND OF THE INVENTION

1. Field of the Invention

The present invention relates generally to light generation and reception for touch screen displays, and more particularly, to an inexpensive, simple to make, self-aligning molded waveguide array made of an optically transparent material that can be used to generate a grid or lamina of light and receive the light for detection with touch screen displays.

2. Description of the Related Art

User input devices for data processing systems can take many forms. Two types of relevance are touch screens and pen-based screens. With either a touch screen or a pen-based screen, a user may input data by touching the display screen with either a finger or an input device such as a stylus or pen.

One conventional approach to providing a touch or pen-based input system is to overlay a resistive or capacitive film over the display screen. This approach has a number of problems. Foremost, the film causes the display to appear dim and obscures viewing of the underlying display. To compensate, the intensity of the display screen is often increased. However, in the case of most portable devices, such as cell phones, personal digital assistants, and laptop computers, the added intensity requires additional power, reducing the life of the battery of the device. The films are also easily damaged. In addition, the cost of the film scales dramatically with the size of the screen. With large screens, the cost is therefore typically prohibitive.

Another approach to providing touch or pen-based input systems is to use an array of source Light Emitting Diodes (LEDs) along two adjacent X-Y sides of an input display and a reciprocal array of corresponding photodiodes along the opposite two adjacent X-Y sides of the input display. Each LED generates a light beam directed to the reciprocal photodiode. When the user touches the display, with either a finger or pen, the interruptions in the light beams are detected by the corresponding X and Y photodiodes on the opposite side of the display. The data input is thus determined by calculating the coordinates of the interruptions as detected by the X and Y photodiodes. This type of data input display, however, also has a number of problems. A large number of LEDs and photodiodes are required for a typical data input display. The position of the LEDs and the reciprocal photodiodes also need to be aligned. The relatively large number of LEDs and photodiodes, and the need for precise alignment, make such displays complex, expensive, and difficult to manufacture.

Yet another approach involves the use of polymer waveguides to both generate and receive beams of light from a single light source to a single array detector. These systems tend to be complicated and expensive and require two kinds of alignment, between the transmit and receive waveguides and between the lenses and the waveguides. The waveguides are usually made using a lithographic process that can be expensive or difficult to source.

Accordingly, there is a need for an inexpensive, simple to make, self-aligning or no alignment required molded waveguide made of an optically transparent material and that can be used to generate a grid or lamina of light for use with touch screen displays.

SUMMARY OF THE INVENTION

The present invention relates to an apparatus and method for an inexpensive, simple to make, molded waveguide array made of an optically transparent material and that can be used to generate a grid or lamina of light for use with touch screen displays. The molded waveguide substrate includes a plurality of molded lenses and a plurality of waveguide grooves corresponding to and aligned with the plurality of integral lenses respectively. After the substrate is molded, the grooves are filled with an optically transparent material to optically couple and align the plurality of lenses and the plurality of grooves respectively. In one application, the molded waveguide substrate is positioned adjacent a touch screen device. A light transmitter and an imaging device are optically coupled to the molded waveguide substrate, and a processing device is coupled to the imaging device. The processing device is configured to determine a data entry to the touch screen by deciphering the coordinates of an interrupt in the light created in the free space adjacent the touch screen device when a data entry is being made to the touch screen device.

BRIEF DESCRIPTION OF THE DRAWINGS

The invention, together with further advantages thereof, may best be understood by reference to the following description taken in conjunction with the accompanying drawings in which.

In the figures, like reference numbers refer to like components and elements.

DETAILED DESCRIPTION OF THE INVENTION

Figure 1:
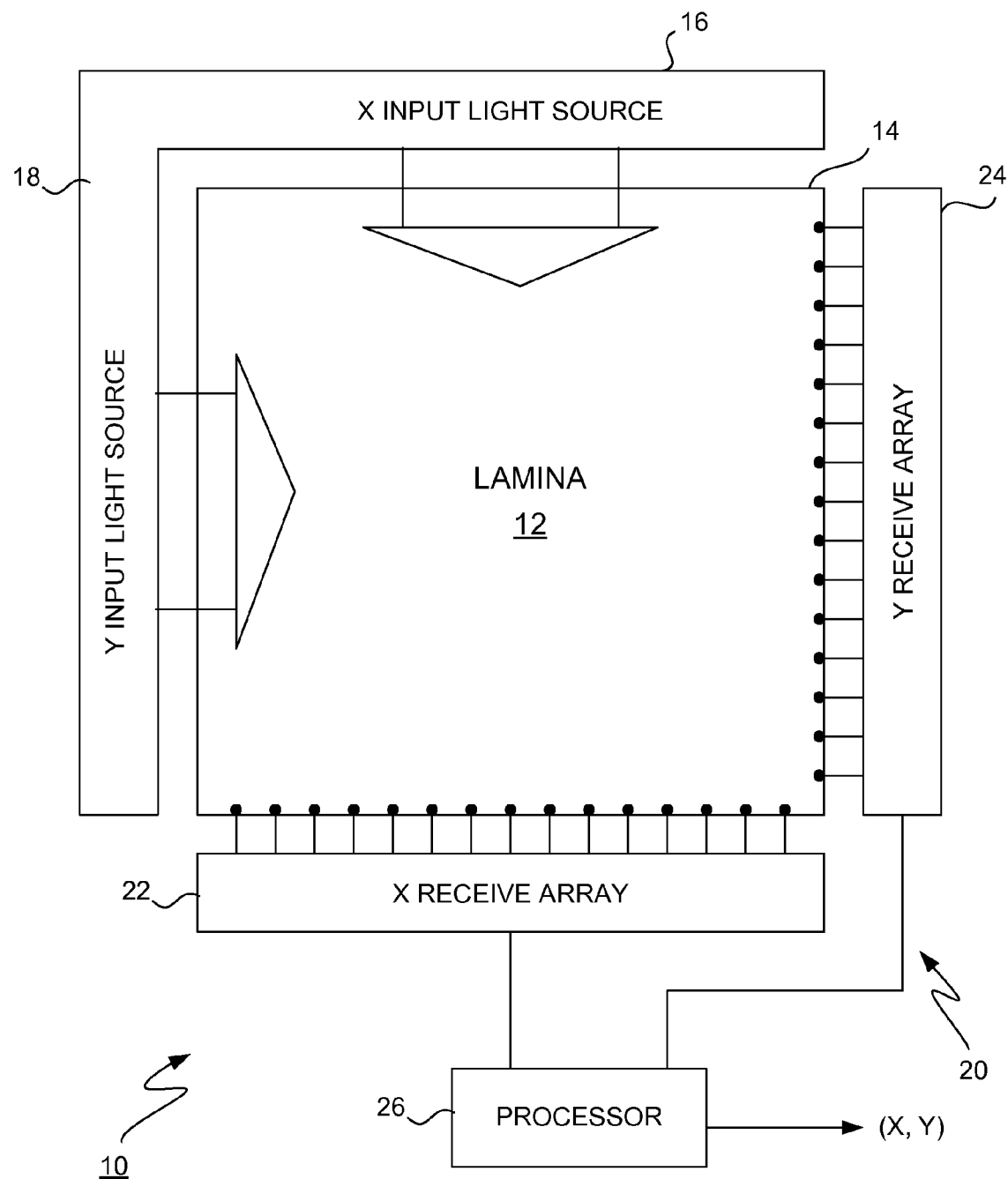
FIG. 1 is a touch screen display device.

Referring to FIG. 1, a touch screen data input device is shown. The data input device 10 defines a continuous sheet or "lamina" 12 of light in the free space adjacent to a touch screen 14. The lamina 12 of light is created by an X and Y input light sources 16 and 18 respectively. An optical position detection device 20, optically coupled to the lamina of light, is provided to detect data entries to the input device by determining the location of interrupts in the lamina caused when data is entered to the input device. The optical position detection device 20 includes an X receive array 22, a Y receive array 24 and a processor 26. During operation, a user makes a data entry to the device 10 by touching the screen 14 using an input device, such as a finger, pen or stylus. During the act of touching the screen, the lamina 12 of light in the free space adjacent the screen is interrupted. The X receive array 22 and Y receive array 24 of the optical position detection device 20 detect the X and Y coordinates of the interrupt. Based on the coordinates, the processor 26 determines the data entry to the device 10. For more information on the data entry device 10, see co-pending, U.S. application Ser. No. 10/817,564, entitled Apparatus and Method for a Data Input Device Using a light Lamina Screen and an Optical Position Digitizer and filed on Apr. 1, 2004, incorporated by reference herein for all purposes.

Figure 2:
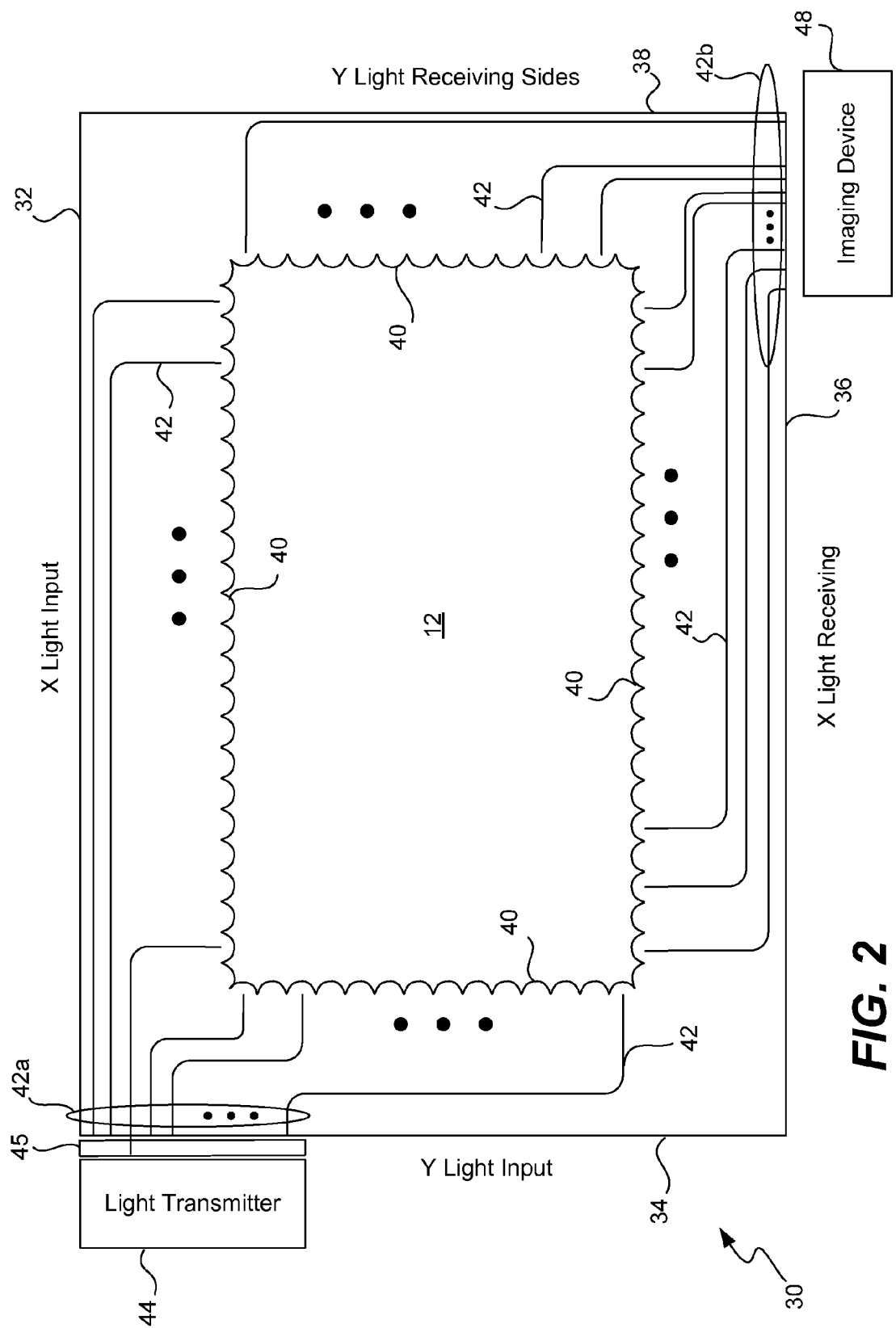
FIG. 2 is a top view of a molded waveguide for use with the touch screen display device according to the present invention.

FIG. 2 is a top view of a molded waveguide substrate for use with the data entry device 10 according to the present invention. The waveguide substrate 30 in the embodiment shown includes X and Y light input sides 32 and 34 and X and Y light receiving sides 36 and 38. Each side 32-38 includes a plurality of lenses 40. Each lens 40 is optically coupled to a waveguide 42. The waveguides 42 are grooves formed in the waveguide substrate 30. The grooves are filled with an optically transparent material having an index of refraction higher than the waveguide substrate 30. A first sub-set 42a of the waveguides 42 are optically coupled to a light transmitter 44, such as a Vertical Cavity Surface Emitting Laser (VCSEL). The first sub-set of waveguides 42a are responsible for guiding light generated by the transmitter 44 to the corresponding lenses 40 along the X and Y light input sides 32 and 34 respectively. A coupling horn 45, made of a high index of refraction material, is positioned between the light transmitter 44 and the inputs of the waveguides 42a. The coupling horn is responsible for controlling or directing the light from the transmitter 44 to the light inputs of the waveguides 42b. The light exiting the lenses 40 along the X and Y light input sides 32 and 34 creates a plane or lamina 12 of light between the four sides 32-38 of the waveguide substrate 30. A second sub-set 42b of the waveguides 42 are optically coupled to an imaging device 48, such as a MOS imaging chip or a Charge Coupled Device (CCD). The second set of waveguides 42b are responsible for guiding light received by the lenses 40 along the X and Y light receiving sides 36 and 38 to the imaging device 48.

The waveguide substrate 30 may be used with the data entry device 10 described above. In this embodiment, the waveguide substrate 30 is positioned adjacent the touch screen 14. The light transmitter 44 and the imaging device 48 are optically coupled to the waveguides 42a and 42b of substrate 30 respectively. During operation, the lamina 12 of light is created in the free space adjacent the touch screen 14 by the light transmitted from the X and Y light input sides 32 and 34 of the substrate 30. More specifically, light from the transmitter 44 is guided through the waveguides 42a to the lenses 40 along the X and Y light input sides 32 and 34 respectively. During the act of touching the screen, the lamina 12 of light in the free space adjacent the screen 14 is interrupted. The lenses 40 along the X and Y light receive sides 36 and 38 focus light from the lamina 12 into their respective waveguides 42b to the imaging device 48. The lenses 40 in the optical path of an interrupt will typically receive little or no lamina light (i.e., a shadow). The imaging device 48 converts the received light signals from the waveguides 42b to corresponding electrical signals. The magnitude of the electrical signals corresponding to the waveguides 42b that receive little or no light due to a shadow or interrupt in the lamina 12 are different than the electrical signals corresponding to waveguides 42b that receive non-blocked lamina light. Based on this difference in magnitude, the processor 26 (not shown), coupled to the imaging device 48, determines the X and Y coordinates of the data entry to the device 10.

In various embodiments, the lenses 40 are three dimensional and can have optical properties resulting in the creation of a lamina 12 as described above or a grid of light. For more details using a grid of light for a data input device, see U.S. Pat. No. 5,914,709, incorporated by reference herein for all purposes. For more details on the lenses 40, see co-pending, commonly assigned U.S. application Ser. No. 10/862,007 entitled "TECHNIQUES FOR MANUFACTURING A WAVEGUIDE WITH A THREE-DIMENSIONAL LENS" filed Jun. 4, 2004, and co-pending, commonly assigned U.S. application Ser. No. 10/862,003 entitled "WAVEGUIDE WITH A THREE-DIMENSIONAL LENS" filed Jun. 4, 2004, also incorporated herein by reference for all purposes.

Figure 3:
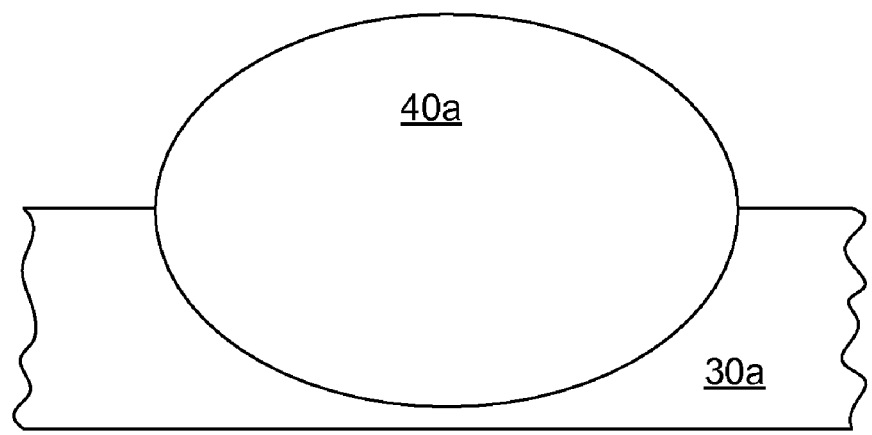
FIG. 3 is a front enlarged view of a lens and waveguide on the molded waveguide according to the present invention.

Referring to FIG. 3, an enlarged front view of a lens 40 and waveguide 42 on the waveguide substrate 30 according to the present invention is shown. As illustrated in the figure, the base of the lens surface 42a is flush with the surface 30a of the waveguide substrate 30. The body (not shown) of the lens tapers backward to the waveguide groove 42.

Figure 4:
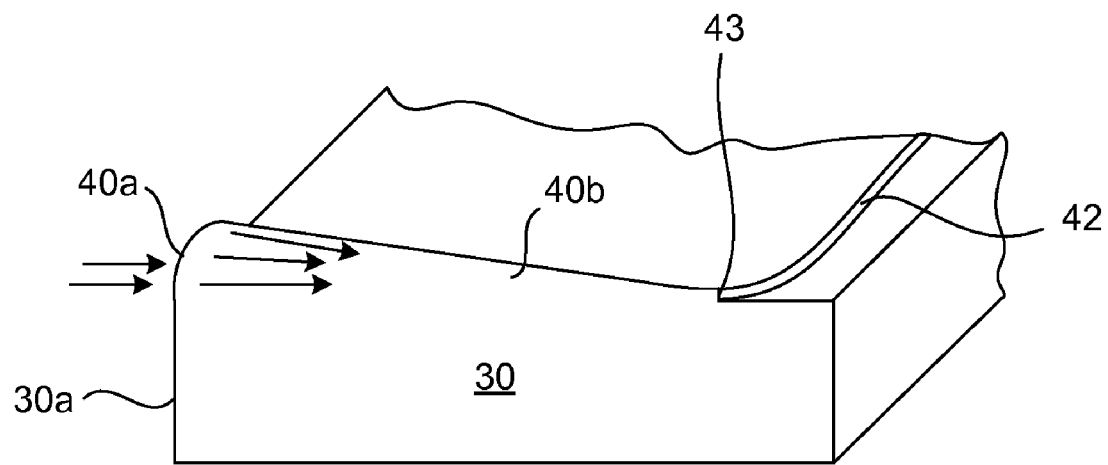
FIG. 4 is a cross-section view of a lens and waveguide on the molded waveguide of the present invention.

Referring to FIG. 4, a cross-section view of a lens 40 and waveguide 42 on the waveguide substrate 30 according to the present invention is shown. In this view, the base of the lens surface 42a is flush with the surface 30a of the waveguide substrate 30 and curves backward in the direction of the waveguide 42. This curvature aids the lens in focusing received light to the waveguide 42. This figure also illustrates the tapered body 40b of the lens 40 as it approaches the waveguide 42. In an alternative embodiment, the lens 40 is formed in a half-circular shape. Such a configuration would have preferable optical properties over that shown in FIG. 4. However, the half-circular shape would be more difficult to mold and would result in an undercut region at the lens-substrate interface.

Referring to FIG. 4, a perspective cross section view of a lens 40 and waveguide 42 on the waveguide substrate 30 according to the present invention is shown. In this view, the molded lens 40 is molded with the waveguide substrate 30 This curvature aids the lens 40 in focusing received light at the entrance 43 of the waveguide 42. As described in more detail below, the waveguides 42 are formed by grooves formed in the substrate 30 which are filed with an optically transparent material. In an alternative embodiment, the lens 40 is formed in a half-circular shape. Such a configuration would have preferable optical properties over that shown in FIG. 4. However, the half-circular shape would be more difficult to mold and would result in an undercut region at the lens-substrate interface.

Figure 5:
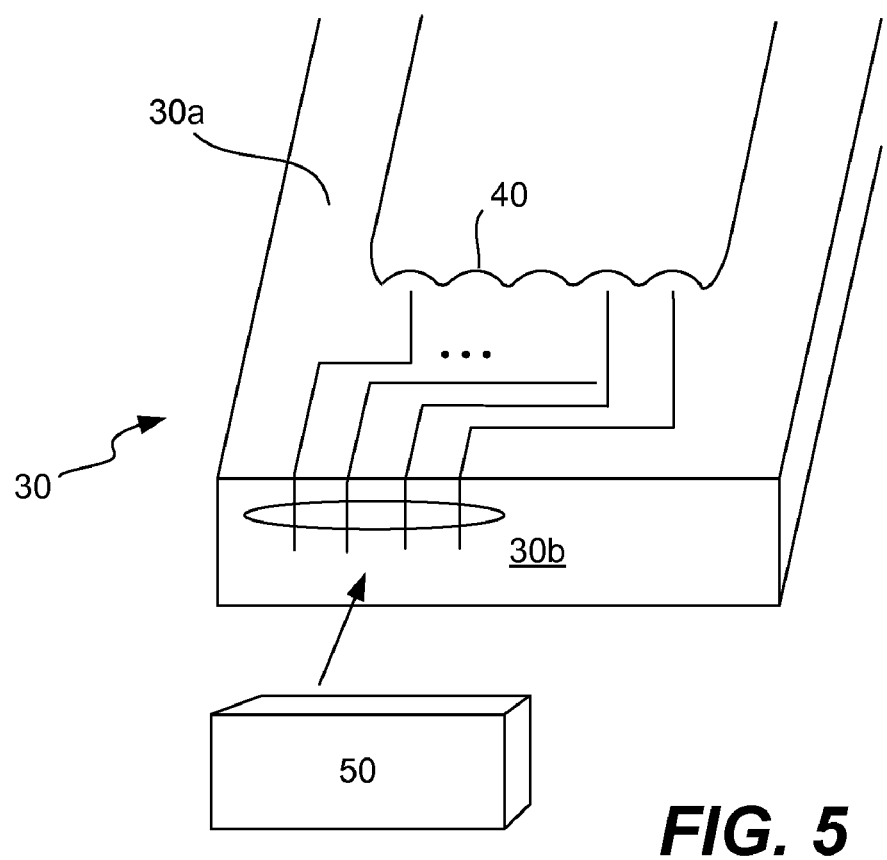
FIG. 5 is a perspective view of the molded waveguide according to another embodiment of the present invention.

In one embodiment, the edges of the substrate 30 adjacent the lenses 40 may be scalloped. This feature is illustrated in FIG. 5. The edges 52 of the substrate 30 may also be rounded or curved at locations where the waveguides 42 extend over two surface of the substrate 30, as illustrated in FIG. 5. The rounded edges tend to improve the optical performance of the waveguides compared to squared edges.

Figure 6:
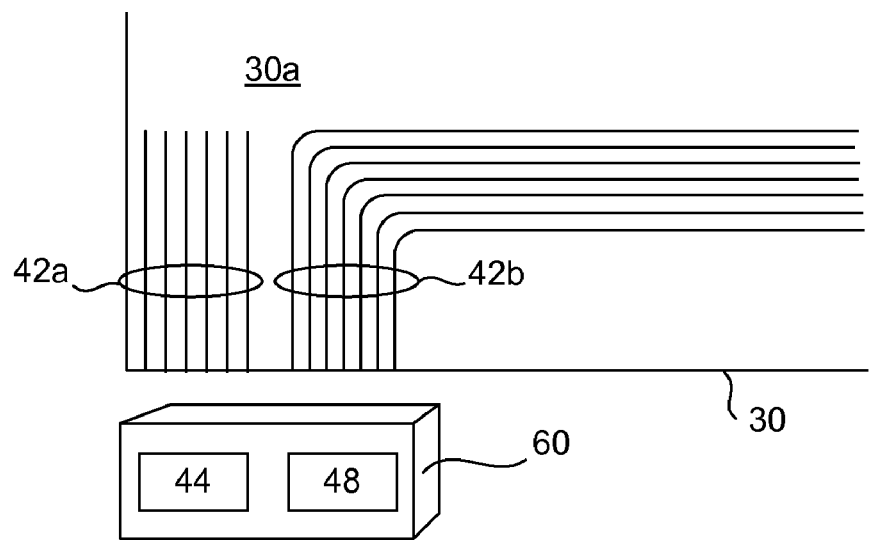
FIG. 6 is another perspective view of the molded waveguide according to yet another embodiment of the present invention.

FIG. 6 is another perspective view of the molded waveguide according to yet another embodiment of the present invention. In this embodiment, the first sub-set 42a and the second sub-set 42b of waveguides 42 are terminated at adjacent locations on the top surface 30a of the substrate 30. This embodiment is convenient because it allows both a light transmitting device 44 and an imaging device 48 to be mounted on a single substrate 60 at one location (as opposed to spaced locations as shown in FIG. 1). Again, with this embodiment, the waveguides 42 may be terminated on the top surface 30a of the substrate 30, any side surface (i.e., 30b as illustrated in FIG. 5), or even the bottom surface of the substrate 30.

Figure 7:
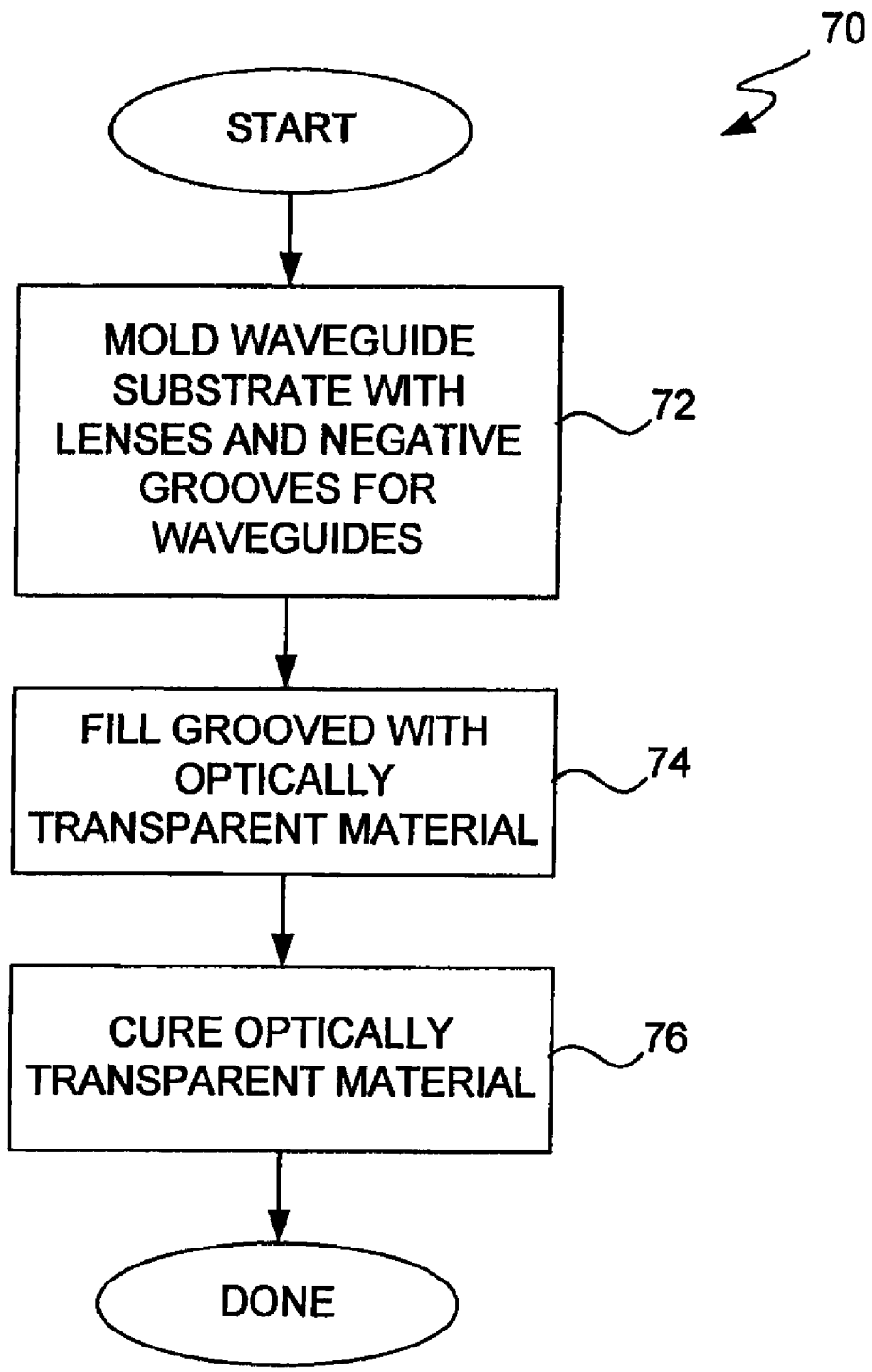
FIG. 7 is a flow diagram illustrating the steps of making the molded waveguide according to the present invention.
Figure 8A:
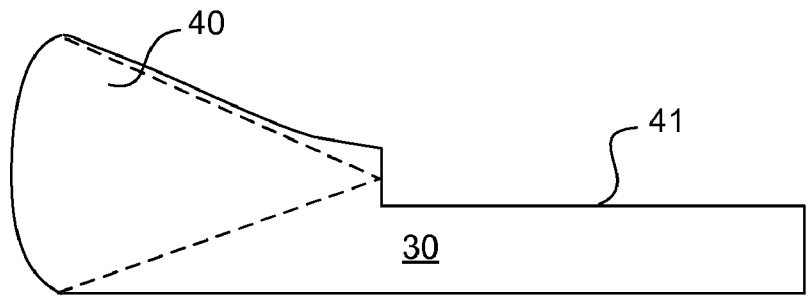
FIG. 8A through 8D show the structure at each step of making the molded waveguides as specified in FIG. 7 and according to the present invention.
Figure 8B:
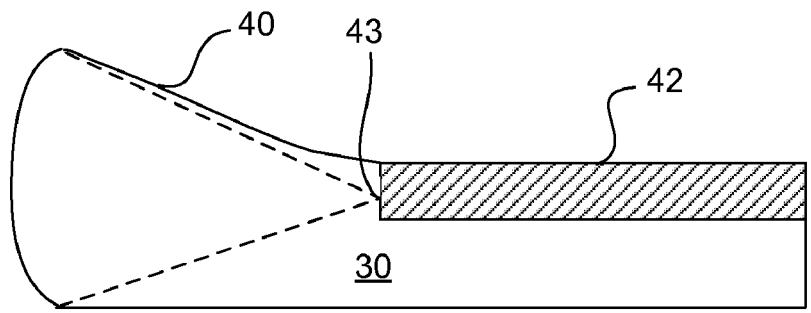
Figure 8C:
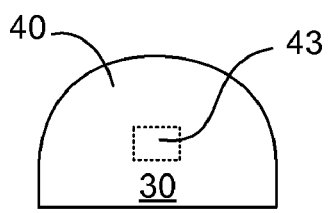
Figure 8D:
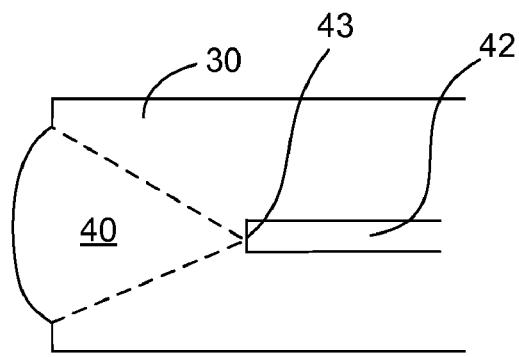

FIG. 7 is a flow diagram 70 illustrating the steps of making the waveguide 30 according to the present invention. FIG. 8A-8D shows in the waveguide structure at each step defined in the flow chart of FIG. 7. In the initial step 72, the substrate 30 is molded using either injection or compression molding. With either embodiment, the lenses 40 and negative grooves 41 for the waveguides 42 are all formed in a single molding process. See FIG. 8A. After the substrate 30 has been molded, the negative grooves 41 are filled with an optically transparent material to form the waveguides 42 (step 74). See FIG. 8B. For example, the negative grooves can be filled using capillary action or over-filling the grooves and then wiping away the excess. In a final step 76, the optically transparent material in the grooves is cured, completing the process of making the waveguide substrate 30. The aforementioned two-step molding process enables the correct amount of molding material and optically transparent material to be used in the location of the lenses 40 and waveguides 42 respectively. FIGS. 8C and 8D show front and top down views of the final structure.

With injection molding embodiment, the substrates 30 are made from an acrylic material having an index of refraction of approximately n=1.5. After the substrates 30 are molded, the negative grooves 41 are filled with the optically transparent material in one of the manufacturing methods mentioned herein. The optically transparent material is then cured. Alternatively with compression molding, the substrates 30 are molded out of a large sheet of substrate material using heat and pressure. When the substrates are pressed, they include the lenses 40 and the negative grooves 41 for the waveguides 42. The negative grooves 41 are later filled, in the same manner as described above, with an optically transparent material. In one embodiment, a substrate material of polycarbonate having an index of refraction of approximately n=1.56 is used with compression molding. The optically transparent material, as previously noted, has an index of refraction greater than that of whatever substrate material is used. It is also preferable, although not absolutely necessary, that the optically transparent material have the properties of being optically curable, have a viscosity that can be altered or controlled if capillary filling of the negative grooves 41 is used, and is inexpensive. In one embodiment, a UV curable material, such as an optical adhesive urethane from Norland Products, Cranbury, N.J. may be used to fill the negative grooves. Alternatively, an optical epoxy from a company such as Epoxy Technologies, Billerica, Mass., may be used. While urethanes and epoxies are mentioned herein, they should in no way be construed as limiting the present invention. In various embodiments, any material having the appropriate index of refraction, clarity, viscosity, surface energy, etc. may be used.

In various embodiments of the invention, the lenses 40 are molded to have a dimension ranging from 50 to 2000 microns in diameter. The negative grooves 41 used to form the waveguides are molded to have a depth 5 to 50 microns deep and 3 to 20 microns wide. The substrate 30 can be molded from a variety of materials having an index of refraction ranging from 1.0 to 2.0. In one specific embodiment, the negative grooves are approximately 7.8 microns wide, 20 to 25 microns deep, and have a slight angle to the walls, ranging from 3 to 5 degrees. The height and diameter of the lenses 40 is an arbitrary design choice. Generally speaking, the factors that determine the size of the lenses 40 are indexes of refraction of the substrate 30 and the optically transparent material, the dimensions of the waveguides 42, and the desired coupling efficiency of the system. In one specific embodiment, the lenses 40 are 250 microns high and have a diameter ranging from 750 microns to 1 millimeter in diameter. It should be noted that all the dimensions provided below are exemplary and in know way should be construed as limiting the invention. Lastly, the substrate can be molded into any desired shape, including but not limited to, a one dimensional member, square, rectangle, circle, oval, etc.

The term molding in this application is intended to be broadly construed. It is intended to cover not only injection and compression molding as described above, but also for example embossing and optical micro-molding. Embossing is a type of molding where a hot die is forced onto the molding material. The heat and pressure melts and shapes the substrate 30 to assume a desired pattern as defined by the die. Optical micro-molding involves the use of light curable materials, such as epoxies and urethanes. Typically the light curable material used for the substrate will have a first index of refraction and the backfill material used to fill the negative grooves will have a second index of refraction, higher than the first index of refraction. Similarly, the aforementioned embodiments have been described with reference to lenses 40. However, any optical element, such as diffraction gratings, filters, bragg gratings, coupling horns as well as lenses can be used. Lastly, the configuration of the substrate 30 is not necessarily limited to the "picture frame" shape illustrated in Figure. The substrate can be molded to virtually any desired shape, such as but not limited to an elongated or straight substrate, round, oval, or an L-shaped substrate, etc. Two L-shaped substrates can be placed together to form the picture frame like structure shown in FIG. 1 for example. The molding of L shaped substrates is highly space efficient and would enable the fabrication of many substrates in a single molding operation.

The negative grooves can be filled in a number of ways according to the present invention. In addition to the filling the grooves and then wiping away the excess, or using capillary action, other techniques can be used. For example the substrate 30 be coated with the optically transparent material and then etched, leaving the optically transparent material in the grooves. The etching can be performed using ion milling, photo-etch, or a chemical etch. A coating and dipping process may also be used. For example, the substrate 30 may be coated with a non-sticking material, such as Teflon, in all areas except the negative grooves. The coated substrate is then dipped into a bath of the optically transparent material which sticks in the area of the grooves but does not stick anywhere else.

The present invention provides a number of useful features. Foremost, it is very inexpensive to make. It is also very flexible. The number and location of mirrors and waveguides can be readily defined as desired by fabricating molds as needed. The waveguides and the lenses are also self-aligning during the molding process. Any problems with optical alignment are therefore substantially eliminated. Furthermore, the dimension, location, size and optical properties of the lenses 40 and waveguides 42 can all be easily modified by using a new mold with the desired features.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method, comprising;
   molding a waveguide substrate, the molding of the waveguide substrate including:
      molding a plurality of optical elements integral with the substrate; and
      molding a plurality of negative waveguide grooves in the substrate and optically aligned with the plurality of optical elements integrally molded with the substrate respectively; and
   filling the negative grooves with an optically transparent material and thereby optically coupling the plurality of optical elements and the plurality of grooves filled with the optically transparent material respectively.

2. The method of claim 1, wherein the molding the plurality of optical elements further comprises molding a plurality of three-dimensional lenses.

3. The method of claim 1, wherein the molding of the plurality of optical elements further comprises molding the optical elements to have a dimension ranging from 50 to 2000 microns in diameter.

4. The method of claim 1, wherein the molding the plurality of negative waveguide grooves further comprises forming the grooves approximately 5 to 50 microns deep into the substrate.

5. The method of claim 1, wherein the molding the plurality of negative waveguide grooves further comprises forming the grooves approximately 5 to 50 microns wide.

6. The method of claim 1, wherein the molding the waveguide substrate further comprises the molding of the substrate with a material having an index of refraction ranging from n=1.0 to 2.0.

7. The method of claim 1, further comprising molding the waveguide substrate from a material having a first index of refraction and filling the grooves with the optically transparent material having a second index of refraction, wherein the second index of refraction is greater than the first index of refraction.

8. The method of claim 1, further comprising molding the plurality of optical elements to have optical properties to create a lamina of light when light is provided to inputs of the waveguides grooves.

9. The method of claim 1, further comprising molding the plurality of optical elements to have optical properties to create a grid of light when light is provided to inputs of the waveguides grooves.

10. The method of claim 1, further comprising molding the waveguide substrate having a first sub-set of the plurality of the negative waveguide grooves extending in a first direction along a first axis.

11. The method of claim 10, further comprising molding the waveguide substrate having a second sub-set of the plurality of the negative waveguide grooves extending in a second direction along a second axis.

12. The method of claim 11, wherein the first axis and the second axis are perpendicular to each other.

13. The method of claim 1, further comprising molding the waveguide substrate such that the plurality of the negative waveguide grooves extend on a first surface of the substrate and a second surface of the substrate, wherein the first surface and the second surface are either perpendicular or parallel to one another.

14. The method of claim 1, wherein a first sub-set of the plurality of waveguide grooves are configured to be optically coupled to a light emitter.

15. The method of claim 1, wherein a second sub-set of the plurality of grooves are configured to be optically coupled to an imaging device.

16. The method of claim 1, wherein the filling of the negative grooves further comprises using capillary action to fill the grooves with the optically transparent material.

17. The method of claim 1, wherein the filling of the negative grooves further comprises over-filling the grooves with the optically transparent material and then removing any excess of the optically transparent material.

18. The method of claim 1, further comprising curing the waveguide substrate after the grooves are filled with the optically transparent material.

19. The method of claim 1, further comprising optically aligning during the molding process the plurality of optical elements and the plurality of the negative waveguide grooves respectively.

20. The method of claim 1, wherein molding the waveguide substrate further comprises molding the waveguide substrate into one of the following shapes: a one a straight substrate; square; L-shaped, rectangle, triangle, round, or an oval shape.

21. The method of claim 1, further comprising:
   positioning the molded waveguide substrate adjacent a touch screen device, the molded waveguide being configured to create light in the free space adjacent the touch screen device;
   optically coupling a light transmitter to the molded waveguide substrate; and
   optically coupling an imaging device to the molded waveguide substrate.

22. The method of claim 21, further comprising connecting a processing device to the imaging device, the processing device configured to determine a data entry to the touch screen by deciphering the coordinates of an interrupt in the light created in the free space adjacent the touch screen device when a data entry is being made to the touch screen device.

23. The method of claim 1, wherein the molding of the waveguide substrate further comprises molding the waveguide substrate using one of the following molding techniques: injection molding; compression molding; embossing; optical micro-molding.

24. The method of claim 1, wherein the optical elements comprise at least one of, but not limited to the following optical elements: lenses, gratings, bragg gratings, coupling horns, etc.

25. The method of claim 1, wherein the molding of the negative waveguide grooves further comprises molding the waveguide grooves to have angled walls ranges from 3 to 5 degrees.

26. The method of claim 1, further comprising molding the plurality of negative waveguide grooves to approximately 6 to 8 microns wide and 20 to 25 microns deep.

27. The method of claim 1, further comprising molding the plurality of optical lenses to have a height ranging from 40 to 250 microns.

28. The method of claim 25, further comprising molding the waveguide substrate from a polycarbonate material.

29. The method of claim 1, further comprising molding the plurality of optical lenses to have a diameter ranging from 750 microns to 1 millimeter.

30. The method of claim 1, further comprising molding the waveguide substrate from a light curable material.

31. The method of claim 30, wherein the light curable material comprises an epoxy or urethane.

32. The method of claim 1, wherein the optically transparent material consists of; a UV curable material, adhesive urethane or an optical epoxy.

33. The method of claim 1, further including treating portions of the waveguide substrate other than those defining the plurality of grooves with a non-stick material that has poor adhesion to optically transparent material;

wherein filling of the negative grooves further comprises over-filling the grooves with the optically transparent material such that the optically transparent material has poor adhesion to said treated portion; and wherein removing excess portions of the optically transparent material includes removing the material from the treated portions of the substrate.

34. The method of claim 33, wherein treating portions of the waveguide substrate includes forming a layer of Teflon® on the waveguide substrate such that the Teflon® material does not extend into the negative grooves.

\* \* \* \* \*